Dec. 26, 1939.  E. J. WITCHGER  2,184,448
COILING DEVICE FOR MEASURING RULES
Filed Jan. 3, 1939
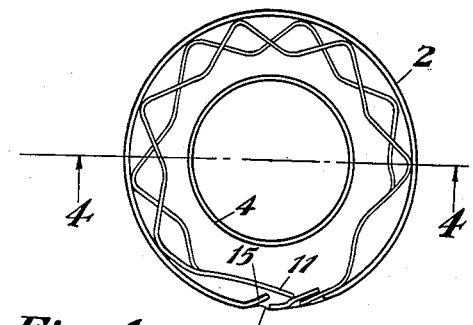
Fig. 1
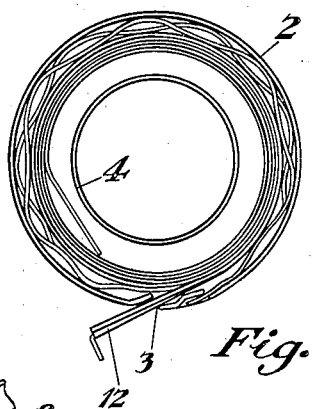
Fig. 2
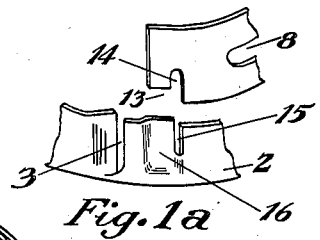
Fig. 1a
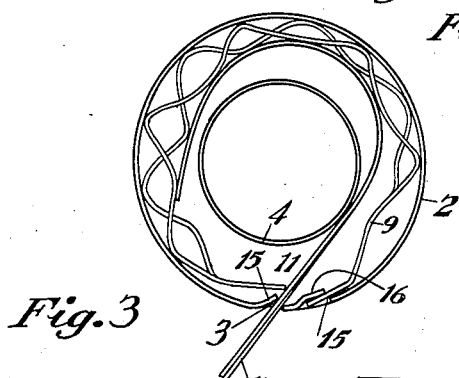
Fig. 3
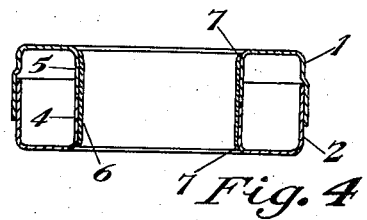
Fig. 4
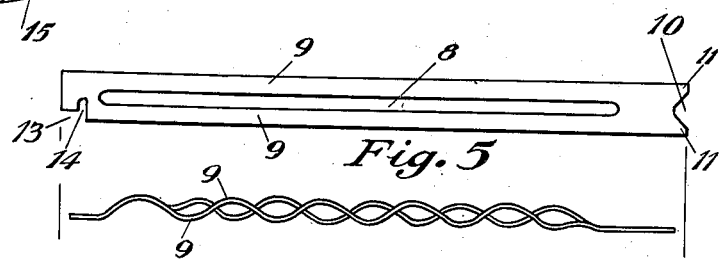
Fig. 5
Fig. 6
Fig. 7
INVENTOR.
EUGENE J. WITCHGER
BY George B. Willcox
ATTORNEY.

Patented Dec. 26, 1939

2,184,448

UNITED STATES PATENT OFFICE 2,184,448

COILING DEVICE FOR MEASURING RULES

Eugene J. Witchger, Saginaw, Mich., assignor to The Lufkin Rule Company, Saginaw, Mich., a corporation of Michigan Application January 3, 1939, Serial No. 249,041

3 Claims. (Cl. 33—138)

This invention relates to means for controlling and coiling a flexible rule or tape within a casing, particularly the type known in the trade as "push-pull" rules wherein a free length of flexible material such as ribbon metal, usually of concavo-convex cross-section is stowed in the form of an outside wound coil by pushing it into the casing by hand.

To facilitate stowing and to attain smooth push-pull action I provide a new and useful means for controlling characteristic spring actions that are inherent in such a rule and also frictional resistances that are developed within the coil itself and resistances occurring between the coil and certain parts of the controlling device.

Heretofore various means have been devised for that purpose, but along with the commercial development of push-pull tapes there has come an increasing need for simplified construction and smoother action.

My present improvement has for some of its objects the simplification, reduction of cost in quantity manufacture, reduction of wear resulting from rubbing contacts between the control device and rule and also contacts between the control device and casing; and the attainment of more perfectly balanced push-pull action which shall be smooth and even at all stages of winding and unwinding, especially during the forming of the first few convolutions, that being the stage of coiling when most of the undesirable jerky and erratic actions of earlier control devices occurred.

Such objects are attained by providing a novel control device comprising a single piece of fabricated and pre-formed ribbon metal which is inserted in the casing close to its inner wall, extending around from one side of the tape opening, where the control device is attached to the casing, to the other side of the opening or even across it. The flexible rule is inserted through the tape opening and passing in between the two ends of the insert travels around in contact with the control device to form the coil.

With the foregoing and certain other objects in view, which will appear later in the specifications, my invention comprises the devices described and claimed and the equivalents thereof.

In the drawing Fig. 1 is a view showing my improved tape control device installed in a tape casing;

Fig. 1a is a fragmentary assembly detail, showing the members of a preferred form of joint for attaching the control means to the peripheral rim of a casing;

Fig. 2 is a view similar to Fig. 1, showing the position of the parts when the rule is stowed;

Fig. 3 is a view similar to Fig. 1, showing the first convolution of a coil being formed during the stowing of the rule;

Fig. 4 is a cross-sectional view of the casing on line 4—4 of Fig. 1, the spring control means being omitted;

Fig. 5 is a plan view of my improved control device as it would appear prior to forming the staggered spring elements;

Fig. 6 is a side view of the parts shown in Fig. 5, including the staggered wave-like portions; and Fig. 7 is a perspective view of the control device in a modified form as it appears before being curved to suit the casing.

Numeral 1 designates the upper member of a tape casing and 2 the interfitting lower member. A conventional tape opening 3 is provided in the rim of the casing. Preferably, the casing has the form of an annular ring defined by the outer rim of members 1, 2 and a central boss defined by inner rim members 4, 5, shown in Fig. 4. The last-mentioned members are flanged inwardly, their marginal edges meeting when assembled. The meeting line of bosses 4, 5 is concealed by a tubular sleeve 6 having ends swaged outwardly at 7, 7, to fasten together the two parts of the casing, thus providing an exceptionally strong internally reinforced container. This casing is well adapted for use in combination with my improved spring control means, although casings differently designed may be used if desired.

Referring now to the more essential subject-matter of my improvement, and observing Fig. 5, it will be seen that a piece of spring material, such as ribbon metal, is divided by means of a longitudinal slot 8 into two parallel longitudinal strips 9, 9 that connect the end portions of the piece beyond the ends of the slot 8. One end portion is cut away at 10 and presents two bearing members or projections 11, 11. These projections are for sliding engagement with a rule 12, as in Fig. 3. The other end of the strip of ribbon metal is shaped to provide a fastening for securing it to the casing, such as a notch 13 and a transverse recess 14.

As shown in Fig. 1a, the recess 14 is adapted for interengagement with the rim 2 of the casing, the latter being formed with a slit 15 and an adjacent inwardly depressed portion 16 that matches the notch 13 and recess 14, so that the parts when assembled will interlock as shown in Figs. 1, 2, 3.

Referring now to Fig. 6, each longitudinal strip 9 is bent to successive curves in opposite directions and so presents an uninterrupted or continuous series of wave-like sinuous portions, preferably disposed in staggered relation to those of the adjacent strip.

In Fig. 5 a piece of ribbon metal is shown, having two strands or strips 9, 9 spaced apart by a slot 8 of appreciable width; but if desired more than two strips may be used, separated by mere slits in the ribbon. Or, both the longitudinal slot 8 and the modified slit may be dispensed with in some types of tape measures. In that example there will be only one longitudinal series of waves extending across the face of the piece of ribbon metal, Fig. 7.

The spring means, Fig. 6, for assisting in controlling and coiling the flexible tape 12 within the casing is attached to the casing by means of the joint, Fig. 1a, and is bent into circular form and nested within the casing, as in Fig. 1. The end portion 11 preferably spans the tape opening 3.

The cylindrical boss 4 is of assistance, as it deflects the entering end of the rule 12 and compels it to encounter the first waves at such an angle as to urge the rule to commence coiling.

It is an object of my improvement to make the initial coiling operation as smooth and uniform as possible, so that the rule shall move into the casing without uneven or erratic action.

As has been stated, the waves of each strip 9 extend in a continuous longitudinal series from one end to the other of the slot 8. This wavelike formation is a desirable feature of my improvement because when the rule 12 is first pushed into the casing, Fig. 3, and is deflected tangentially of boss 4 it advances inwardly until its end encounters one of the first of the series of wavy members 9, compressing the latter by springing it outwardly toward the wall of the casing. As member 9 commences to flatten it extends itself. Its outer crests are in free sliding contact with the wall and so will accommodate the thrust of the rule, even to the extent of becoming temporarily flattened out against the casing wall. Such freedom to slide does not, however, cause any undesirable creeping displacement of the control device as a whole, because any temporary elongation of each crest when flattened by the incoming tape is absorbed by the flexing of the crests ahead. There is no likelihood of damaging the strips 9, because if the entering rule happens to be particularly stiff and resistant to coiling it will merely push harder against the wavy members 9, flattening them in succession against the casing wall which serves as backing or reinforcement and prevents the strips 9 from being injured.

This unitary continuous wave construction has advantages over others wherein bent spring portions had prong-like ends that engaged the casing wall and therefore was not entirely free to slide when the waves were compressed by the action of the rule.

In my improved device creeping of the spring control device is automatically prevented in the following way: As the rule continues to accumulate in the casing as an outside wound coil, Fig. 2, the diameter of the coil increases and the members 9 are all compressed still further towards the rim. That compression does not, however, produce any appreciable elongation of the controlling member in the peripheral direction.

This will be apparent upon considering that the actual length of the control device is of course the length of the median line of its wavy portions, Fig. 6, and it is obvious that should the member 9 be compressed flatwise while straight it would elongate somewhat. But when bent as in Fig. 1 its median length lies on a circle. When compressed by accumulation of the coil the median length does actually increase, but its circle is then larger diameter than before. Consequently the end 11 is substantially free from undesirable creeping movements, and so need not be fastened to the casing wall.

Any sticking or snubbing action produced at the points of bearing of the outwardly yielding members against the wall of the casing is undesirable. Different waves might in that event exert different degrees of spring, especially while the first coil of the rule is being formed, causing uneven or jerky feeding of the rule into the casing. Such undesirable snubbing effect is likely to be produced any time during the life of a tape measure if a spot of rust or other roughness should develop on the inner wall where it could be encountered by the free sharp end of a prong, finger or like non-continuous spring element. The continuity of the waves in my device prevent such undesirable actions.

I have shown and described a casing with a central sleeve or boss 4 that assists in forming the first convolution. The action of the boss is similar to that of a boss described in Patent No. 2,136,769, issued to me November 15, 1938. In some tape measures the boss may be omitted and still possess all other advantages that have been set forth herein.

Referring now to the bearing members 11, 11 at the end of the tape controlling device—preferably they span the tape opening 3 so as to be engaged by the end of the entering rule 12, in Fig. 3. The engagement is very light, the control member being easily flexed, hence the rule will enter the casing easily. When spanning the opening 3 the parts 11 guide the free end of the rule, directing it smoothly past the inwardly projecting lip 15, thus avoiding any jerky movement at that point when the first convolution of the rule is completed.

When the rule is being pulled out and separated from the casing the departure of the last convolution, shown in Fig. 3, will not be announced by any snap action click as the last end passes the opening 3 and the end of lug 15. Instead, it will slide smoothly and silently on the members 11, 11. However, if the ends 11 do not extend clear across the opening 3 but terminate at the left of lip 15, the operation of the control device will not be changed essentially.

Having thus described my invention, what I claim and desire to secure by Letters Patent is:

1. Spring means for controlling and coiling a flexible rule within a casing, comprising a strip of flexible ribbon metal curving throughout its length alternately in opposite directions and presenting mutually co-operating wave-like formations connected together in uninterrupted series and projecting on opposite sides of the median plane of said strip.

2. Spring means for controlling and coiling a flexible rule within a casing, said means comprising a strip of ribbon metal having two end members, one provided with fastening means for securing the same to the casing, the other being free and adapted for sliding engagement with the rule, strips connecting said end members together, the length of each strip between said end members presenting a continuous connected series of flexible wave-like elements that curve alternately in opposite directions, the crest portion of each curved element being staggered in relation to the crest of an adjacent similar element.

3. In combination, a casing having a tape opening, a device for controlling the actions of a flexible rule within the casing, said device comprising a strip of resilient metal, an end of said strip being secured to the casing wall adjacent the tape opening, the other end of said strip being unattached to the casing wall and spanning said tape opening, the strip intermediate its ends presenting wave-like formations connected cooperatively together in an uninterrupted longitudinal series; the outer crests of said wave-like formations being individually in sliding contact with the peripheral wall of the casing, the alternate inner crests being arranged to engage and guide a tape inserted into the casing through said opening.

EUGENE J. WITCHGER.